US00RE35161E

United States Patent [19]

Kumano et al.

[11] E Patent Number: Re. 35,161

[45] Reissued Date of Patent: Feb. 27, 1996

[54] KEYBOARD DEVICE OF ELECTRONIC MUSICAL INSTRUMENT

[75] Inventors: Shinji Kumano; Motoshi Murasaki, Shizuoka, both of Japan

[73] Assignee: Yamaha Corporation, Shizuoka, Japan

[21] Appl. No.: 346,825

[22] Filed: Nov. 30, 1994

Related U.S. Patent Documents

Reissue of:

[64] Patent No.: 4,604,937
Issued: Aug. 12, 1986
Appl. No.: 571,913
Filed: Jan. 17, 1984

U.S. Applications:

[63] Continuation of Ser. No. 60,707, May 12, 1993, abandoned, which is a continuation of Ser. No. 158, 558, Feb. 22, 1988, abandoned.

[30] Foreign Application Priority Data

Jan. 20, 1983 [JP] Japan ..... 58-7955
Jan. 20, 1983 [JP] Japan ..... 58-7956

[51] Int. Cl.[6] ..... G10C 3/12

[52] U.S. Cl. ..... 354/434; 354/435

[58] Field of Search ..... 84/423, 433, 434, 84/435, 436, 439, 440

[56] References Cited

U.S. PATENT DOCUMENTS

| | | | |
|---|---|---|---|
| 1,246,998 | 11/1917 | Pickard et al. | 84/435 |
| 2,116,808 | 5/1938 | Walberg | 84/467 |
| 2,565,239 | 8/1951 | Kostka | 84/435 |
| 3,165,965 | 1/1965 | Lo Duca | 84/435 |
| 3,413,885 | 12/1968 | Van Der Lely | 84/435 |
| 3,447,414 | 6/1969 | Lo Duca | 84/436 |
| 3,736,831 | 6/1973 | May et al. | 84/434 |
| 3,740,448 | 6/1973 | Olszowka et al. | 84/433 X |
| 4,474,100 | 10/1984 | Kondo | 84/434 |
| 4,476,769 | 10/1984 | Kumano | 84/434 |

FOREIGN PATENT DOCUMENTS

| | | | |
|---|---|---|---|
| 692245 | 7/1965 | Italy | 84/433 |
| 869583 | 5/1961 | United Kingdom | 84/435 |

*Primary Examiner*—Howard B. Blankenship
*Attorney, Agent, or Firm*—Blakely, Sokoloff, Taylor & Zafman

[57] ABSTRACT

A keyboard device of an electronic musical instrument has a keyboard frame, a plurality of keys which are aligned on the keyboard frame and which are vertically pivotable, a plurality of return springs each of which corresponds to one of the keys and has one end stopped by the key and the other end stopped by the keyboard frame so as to bias the key toward a nonstruck position, and a plurality of pivot members each of which is disposed on the keyboard frame at an end of a longitudinal axis of the key to correspond to one of the keys. The pivot member has [a circular] *an arcuate* surface to be brought into slidable contact with a back end portion of the key so as to allow the key to perform pivotal movement. The back end portion of the key has [a circular] *an arcuate* surface paired with the [circular] *arcuate* surface of the pivot member and is spring-biased against the [circular] *arcuate* surface of the pivot member by means of the return spring.

24 Claims, 8 Drawing Sheets

KEYBOARD DEVICE OF ELECTRONIC MUSICAL INSTRUMENT

Matter enclosed in heavy brackets [ ] appears in the original patent but forms no part of this reissue specification; matter printed in italics indicates the additions made by reissue.

*This is a continuation of reissue application Ser. No. 08/060,707 filed May 12, 1993 now abandoned, which in turn is a continuation of reissue application Ser. No. 07/158, 558 filed Feb. 22, 1988 now abandoned.*

BACKGROUND OF THE INVENTION

The present invention relates to a keyboard device of an electronic musical instrument and, more particularly, to a structure of a key.

Various types of keyboard devices have been developed to allow a smooth and proper manner of striking or touching the keys of a keyboard instrument and to improve durability thereof. However, these conventional keyboard devices have respective advantages and disadvantages. Only a few keyboard devices are proposed in consideration of operability at the time of assembly or disassembly for a repair.

A typical keyboard device aimed at the smooth touch has a common shaft on which back end portions of the keys are mounted. These keys are aligned to be parallel to each other along a direction perpendicular to the common shaft and can be selectively pivoted about the common shaft. According to this keyboard device, the common shaft must be inserted after all keys are completely aligned. Further, when any one of the keys is to be replaced, the common shaft must be removed from all the keys located outside the key to be replaced, resulting in inconvenience. Such a conventional keyboard device is described in U.S. Pat. No. 3,740,448.

Another conventional keyboard device is proposed wherein support shafts are respectively provided for all keys, and each key has a U-shaped back end portion whose side walls must be expanded outward and mounted on two ends of the corresponding shaft the center of which is fixed. According to this keyboard device, the side walls of the back end portion of each key must be expanded outward, and assembly and disassembly operations are time-consuming and cumbersome. A typical example of the keyboard device of this type is described in Japanese Utility Model Application Disclosure No. 57-60191.

SUMMARY OF THE INVENTION

It is, therefore, a principal object of the present invention to provide a keyboard device of an electronic musical instrument, which is capable of simplifying the assembly and disassembly operations while attaining smooth touch at the key depression.

It is another object of the present invention to provide the keyboard device which attains sufficient durability of the pivot structure as well as smooth touch at the key depression.

In order to achieve the above object of the present invention, there is provided a keyboard device wherein [a pivot member having a circular or arcuated cross section is disposed in a keyboard frame, and a substantially semicircular bearing portion which is brought into] *a pivot member having an arcuate cross section is disposed in a keyboard frame, and a substantially arcuate bearing portion which is brought into* tight contact with an outer surface of the pivot member by means of a return spring is disposed at a back end portion of a key.

According to an aspect of the present invention, there is provided a keyboard device of an electronic musical instrument, comprising:

a keyboard frame;

a plurality of keys which are aligned on the keyboard frame and which are vertically pivotable;

a plurality of return springs each of which corresponds to one of the keys and has one end stopped by the key and the other end stopped by the keyboard frame so as to bias the key toward a nonstruck position; and a plurality of pivot members each of which is disposed on the keyboard frame in a direction perpendicular to a longitudinal axis of the key to correspond to one of the keys, and has an arcuated surface to be brought into slidable contact with a back end portion of the key so as to allow the key to perform pivotal movement, the back end portion of the key being spring-biased against the arcuated surface of the pivot member by means of the return spring.

DESCRIPTION OF THE PREFERRED EMBODIMENT

Figure 1:
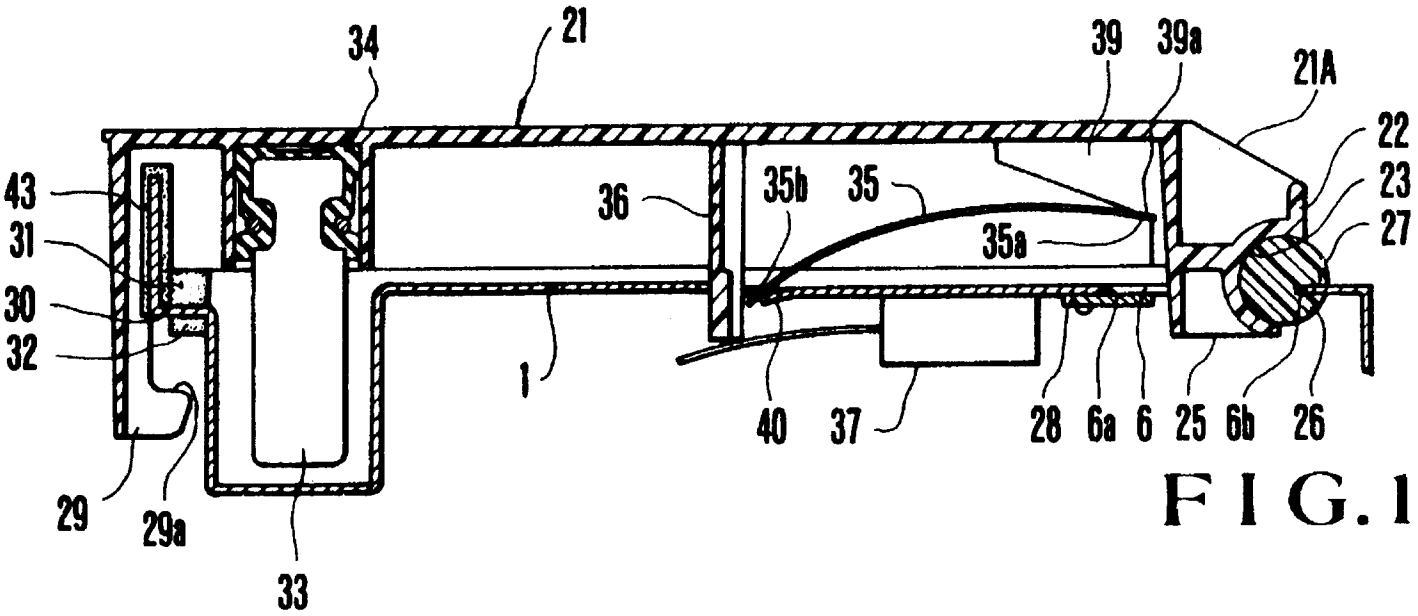
FIG. 1 is a longitudinal sectional view showing a keyboard device of an electronic musical instrument according to an embodiment of the present invention.

FIG. 1 shows a first embodiment of a keyboard device of an electronic musical instrument, esp., the keyboard device which is applied to a natural or white key. Referring to FIG. 1, reference numeral 21 denotes a white key integrally formed by a synthetic resin such as acrylonitrile-styrene resin. The lower side portion of the key 21 is hollow such that the key 21 has a substantially U-shaped breadthwise cross section. A substantially [semicircular] *arcuate* concave bearing portion 23 is formed on a back end face 22 of the key 21.

A through hole 6 is formed in a back end surface of a keyboard frame 1 by punching with a press or the like so as to receive an extended portion 25 extending from the lower surface of a back end portion 21A of the key 21. A pivot member 26 is fitted and fixed to a back edge 6b which defines the through hole 6 of the keyboard frame 1. As shown in FIG. 1 in detail, the pivot member 26 is formed in columnar shape to have a *substantially* circular cross section and is snugly but slidably received in the bearing portion 23 so as to support the key 21 to be pivotal in the vertical direction. The pivot member 26 is made of a plastic material such as an oil-impregnated polyacetal and has a radial fitting groove 27 in which the back edge 6b is fitted. Silicone grease is preferably applied between the surface of the pivot member 26 and the bearing portion 23. A plate 28 is mounted and fixed by a screw on a front edge 6a which defines the through hole 6 so as to partially close the through hole 6, thereby preventing the extended portion 25 of the key 21 from being disengaged from the pivot member 26.

A substantially L-shaped stopper 29 integrally depends from the front end lower surface of the key 21. A lower limit stopper 31 and an upper limit stopper 32 are respectively mounted on the upper and lower surfaces of a front end portion 30 of the keyboard frame 1 so as to determine a vertical pivotal range of the key 21. An inertia weight 33 is mounted through a damper 34 on the lower surface of the front end portion of the key 21. The weight 33 increases the inertia of the key 21 and serves to provide the same key touch as in the conventional piano in cooperation with damping action of the damper 34. The weight 33 is described in detail in U.S. Ser. No. 460,954 of Kumano filed on Jan. 25, 1983 and assigned to the same assignee with the present application (Japanese Patent Application No. 57-104,50; filing date: 1/26/1982) U.S. Ser. No. 460,954 is under examination as Continuation Application No. 725,212 and U.S. Ser. No. 446,491 was allowed with U.S. Pat. No. 4,476,769 (issued Oct. 16, 1984). FIG. 1 shows a state wherein the lower surface of the front end portion of the key 21 abuts against the lower limit stopper 31 when the key 21 is struck. When the key 21 returns to the initial position or nonstruck position by the biasing force of *a return elastic member such as* a return spring 35, an abutment surface 29a of the stopper 29 abuts against the lower surface of the upper limit stopper 32. When a player strikes the key 21 against the biasing force of the return spring 35, an actuator 36 arranged integrally with the key 21 actuates a key switch 37 mounted on the rear surface of the keyboard frame 1, thereby electrically generating a tone corresponding to the key 21.

A spring seat wall 39 is integrally formed with a back end portion of an inner side surface of the key 21. One end 35a of the return spring 35 is stopped by the wall 39. The other end 35b of the return spring 35 is stopped by a stopper portion 40 formed on the upper surface of the keyboard frame 1. The return spring 35 comprises a leaf spring obtained by punching a metal plate having a proper thickness. The return spring 35 is mounted in a buckled state between the key 21 in its undepressed position and the keyboard frame 1. A linear distance between a stopper portion 39a of the wall 39 and the stopper portion 40 of the keyboard frame 1 is slightly shorter than the natural length of the return spring 35. Therefore, when the key 21 is mounted, the return spring 35 is buckled in an arcuated shape along the longitudinal direction thereof. By this deformation, the biasing force of the spring 35 acts on the key 21 clockwise and brings the bearing portion 23 into tight contact 15 with the pivot member 26. The detailed construction is described in U.S. Ser. No. 446,491 of Kumano filed on Dec. 3, 1982 and assigned to the same assignee with the present application (Japanese Patent Application No. 56-196,944 filed on Dec. 9, 1981): U.S. Ser. No. 460,954 is under examination as Continuation Application No. 725,212 and U.S. Ser. No. 446,491 was allowed with U.S. Pat. No. 4,476,769 (issued Oct. 16, 1984). It should be noted that reference numeral 43 denotes a key guide integrally formed with the keyboard frame 1 to regulate lateral pivoting of the key 21.

The pivot mechanism of the key 21 having the structure described above will be described. The basic principle is based on sliding action between a shaft and a hole. However, the vertical pivotal movement of the key of a musical instrument falls within a small angular range between 2° and 5°. When the shaft is in slidable contact with the hole in the range of 360°, the frictional force therebetween is greatly increased, thereby preventing smooth sliding between the shaft and the hole. Therefore, only a part of the shaft is preferably brought into sliding contact with the hole. Based on the above recognition, the bearing portion 23 has [a semicircular] *an arcuate* shape instead of a full-circular shape and is in slidable contact with an opposing surface of the pivot member 26.

The direction of a radial load generated between the bearing portion 23 and the pivot member 26 determines whether or not the bearing portion 23 is brought into rolling contact or sliding contact with the pivot member 26. When the direction of the radial load changes in accordance with pivotal movement of the bearing portion 23, the bearing portion 23 is in rolling contact with the pivot member 26. However, when the director of the radial load does not change, the [pivot member 26] *bearing portion 23* is in sliding contact with the pivot member 26. On the other hand, when the radial load acts from the direction opposing the bearing portion 23 (i.e., from the rear side of the pivot member 26), the bearing portion 23 is separated from the pivot member 26, thereby disabling pivotal movement of the bearing portion 23 with respect to the pivot member 26. Therefore, when the direction of the radial load is regulated such that the bearing portion 23 is always in contact with the pivot member 26, the bearing portion 23 need not be constituted by a hole irrespective of rolling contact or sliding contact. In this sense, the pair consisting of pivot member 26 and the bearing portion 23 can serve the same effect as in the conventional pair of the shaft and the hole.

Figure 2:
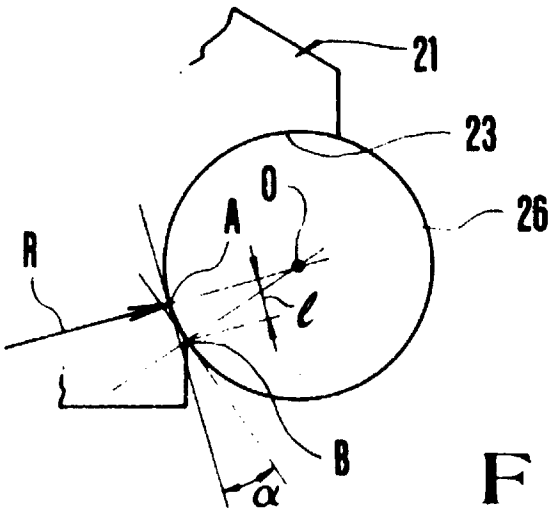
FIG. 2 is a representation for explaining radial load on the pivot member.

The radial load will be described in detail hereinafter. Since the key 21 is biased upward and backward by the biasing force of the return spring 35, the spring force acts as a radial load R on the pivot member, as shown in FIG. 2. The radial load R acts on a center O of the pivot member 26 so as to bring the bearing portion 23 into tight contact with the pivot member 26. The bearing portion 23 is easily brought into sliding contact with the pivot member 26 when a distance 1 between a point A on which the radial load R acts and a lower edge B of the bearing 23 is increased and when a coefficient of friction between the bearing portion 23 and the pivot member 26 is decreased. In addition, the bearing portion 23 is easily brought into sliding contact with the pivot member 26 when an angle ct formed by tangents at points A and B of the pivot member 26 is increased. The distance l is determined by an angle AOB which is equal to the angle $\alpha$. Therefore, the greater the angle AOB becomes, the stabler the sliding contact between the bearing portion 23 and the pivot member 26 becomes. Therefore, when the direction of the radial load R, the angle AOB, and a material having a small coefficient of friction are properly selected, the arcuated surface of the bearing portion 23 can fall within the range of 0° to 180°.

The pivot mechanism having the structure described above can obtain the same effect as in the conventional pivot mechanism consisting of the shaft and the hole, thereby obtaining a good sliding relationship between the bearing portion and the pivot member. As a result, the key 21 can be smoothly pivoted. The pivot member 26 is mounted in the through hole 6 formed in the keyboard frame 1. The key 21 can be independently removed from the keyboard frame 1 when the corresponding plate 28 is removed from the hole 6. In this manner, the keys can be mounted on a shaft in accordance with one-to-one correspondence. Furthermore, the pivot member 26 can be simply mounted/dismounted since it can be mounted/dismounted via the back edge 6b defining the through hole 6 of the keyboard frame 1.

The direction of the radial load as described above varies in accordance with the struck state of the key 21. Changes in radial load will be described with reference to FIGS. 3A to 3D.

Figure 3A:
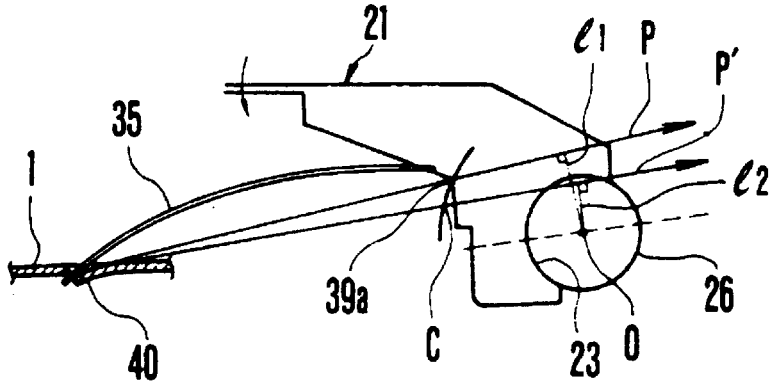
FIGS. 3A to 3D are representations for explaining changes in biasing force of a return spring which acts on a pivot member shown in FIG. 1 and changes in radial load R acting on the pivot member in accordance with such changes in the biasing force of the return spring.

FIG. 3A shows an initial state (nonstruck state) of the key 21. Referring to FIG. 3A, reference symbol P denotes a spring force of the return spring 35 which acts along a line connecting the stopper portion (40 in FIG. 1) of the frame 1 which stops the spring 35 and the stopper portion 39a. In this case, the key 21 is biased clockwise by a moment $P \times l_1$ about the pivot member 26. When the key 21 is struck and pivoted counterclockwise (indicated by an arrow) to the end against the biasing force of the return spring 35, the stopper portion 39a of the key 21 is moved to point C, so that the direction of the biasing force of the return spring 35 changes to as indicated by a line connecting the stopper portion 40 and the point C, and that the spring force P changes to a force P'. Therefore, the distance changes to a distance $l_2$, so that the moment changes to a moment $P' \times l_2$. This moment still acts clockwise so as to return the key 21 to the initial position. Therefore, the bearing portion 23 is still in tight contact with the pivot member 26, so that the corresponding key can be operative. In addition, the return spring 35 prevents the back end portion (the bearing portion 23) of the key 21 from being separated from the pivot member 26.

Figure 3B:
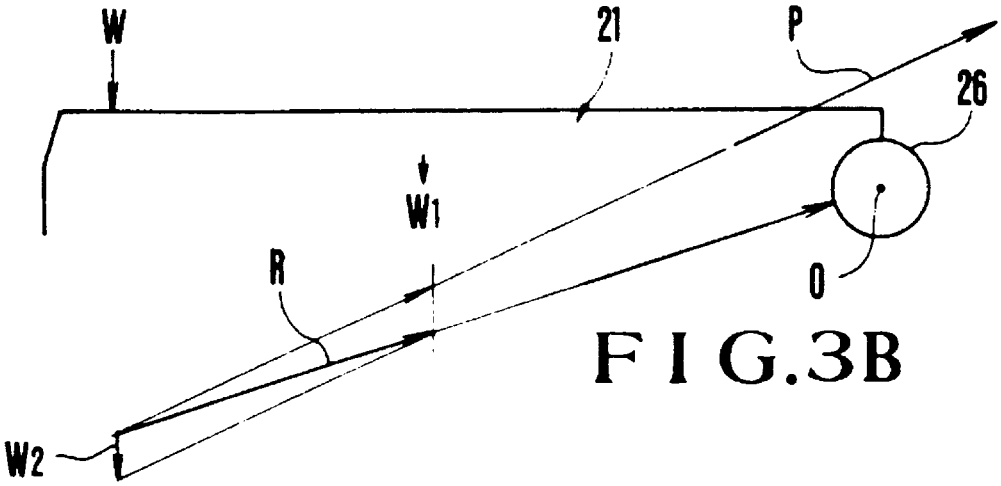
Figure 3C:
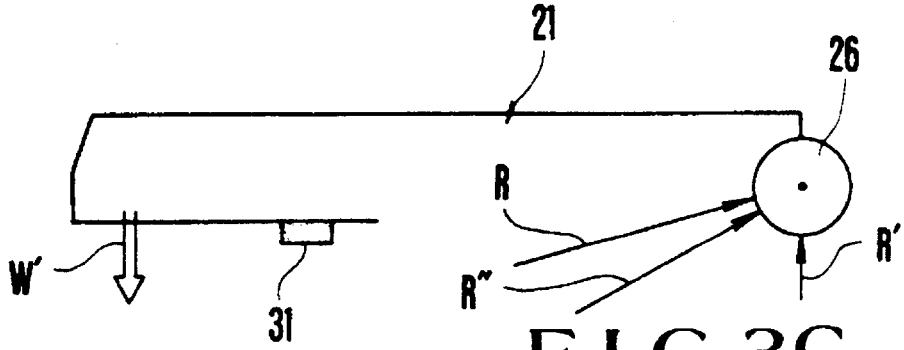
Figure 3D:
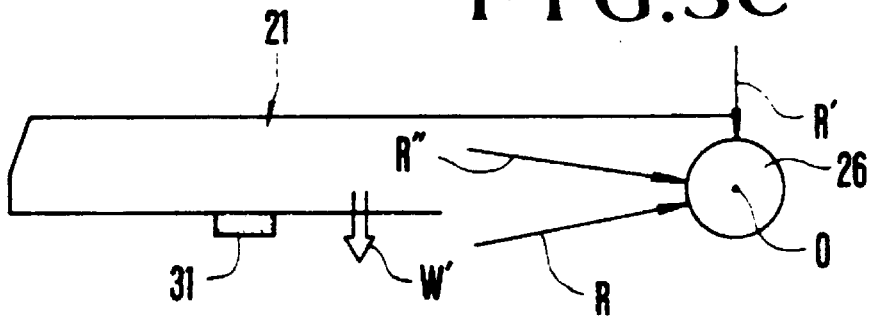

Assume that the key 21 is pivoted by a load W. The key 21 receives the forces P and W and a self weight $W_1$ of the key 21, as shown in FIG. 3B. The forces W and $W_1$ act on the key 21 so as to rotate it counterclockwise. When a resultant force of the forces W and $W_1$ is given to be $W_2$, the key 21 receives the forces P and $W_2$. The forces P and $W_2$ are balanced as moments about the point O, so that a resultant force thereof is directed toward the point O and is defined as the radial force R. However, assume after the key 21 is moved downward to the end and abuts against the lower stopper 31, and a force W' still acts on the key 21, as shown in FIG. 3C. In this case, the key 21 receives a counterclockwise moment acting about the lower stopper 31, so that a force R' is generated and acts on the point O upward. Since the radial load R acts on the key 21, a resultant force R" of the forces R and R' acts on the pivot member 26. The force R" is the radial load when a force W' acts on the key 21. When the position at which the force W' acts changes to a position between the lower limit stopper 31 and the pivot member 26, the directions of the forces R' and R" change as shown in FIG. 3D.

Figure 4:
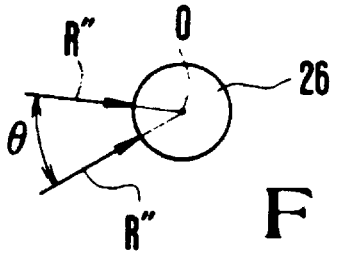
FIG. 4 is a representation showing an angular range within which a radial load acts on the pivot member when a key is depressed or struck.

Since the struck positions of the key 21 change during keyboard performance, the direction of the radial load R" changes within the range of 0° to 180°, as shown in FIG. 4. When the bearing portion 23 is in contact with the pivot member 26 within a minimum angular range $\theta$, the bearing portion 23 will not be separated from the pivot member 26, thereby obtaining the effect as described above.

Figure 5A:
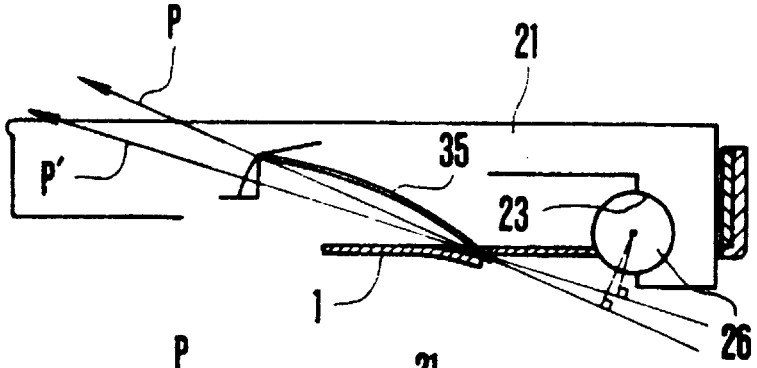
FIGS. 5A to 5D are representations showing a keyboard device of an electronic musical instrument according to another embodiment of the present invention, and changes in biasing force of a return spring which acts on a pivot member and changes in radial load R acting on the pivot member in accordance with such changes in the biasing force of the return spring.
Figure 5B:
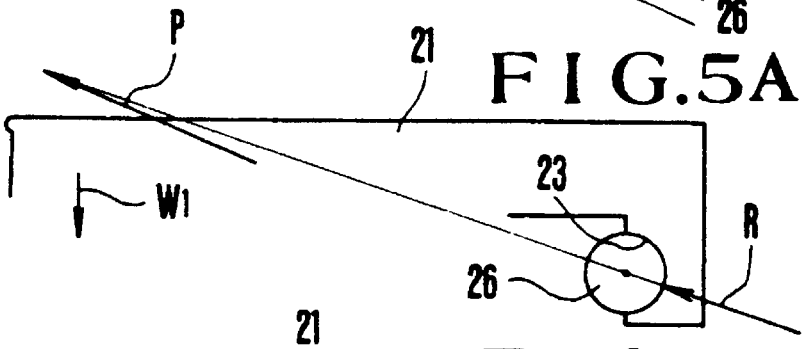
Figure 5C:
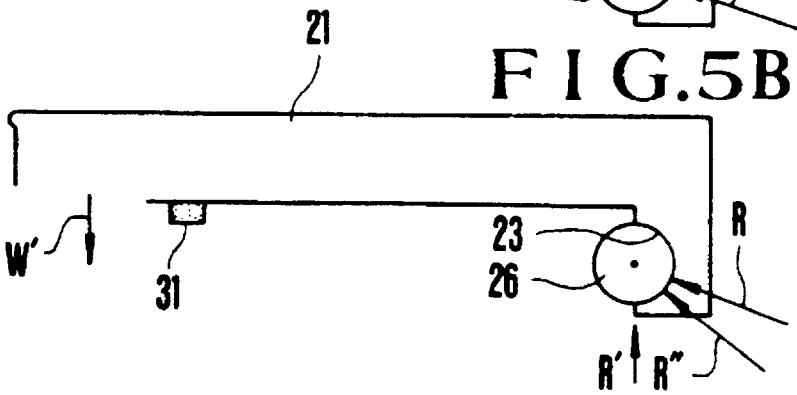
Figure 5D:
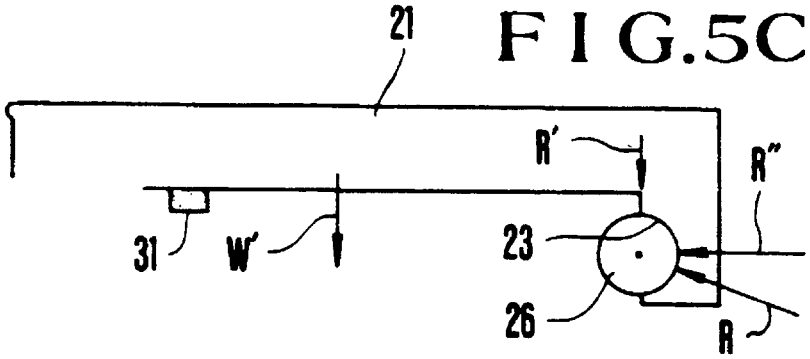

FIGS. 5A to 5D show a second embodiment of the present invention. The keyboard device of this embodiment is substantially the same as that of the first embodiment, expect that a pivot member 26 is located inside the back end portion of a key 21, a return spring 35 is mounted in a reversed manner, a bearing portion 23 is formed inside an extended portion under the back end portion of the key 21, and the bearing portion 23 is brought into sliding contact with a rear half portion the pivot member 26. The pivot member 26 is mounted at a front edge of a through hole 6 formed in a keyboard frame 1. The extended portion of the back end portion of the key 21 is fitted in the hole 6, and the bearing portion 23 is in sliding contact with the pivot member 26. A plate for preventing the extended portion from being removed from the hole 6 is inserted between the vertical wall of the back end of the keyboard frame 1 and the back end portion of the key 21. FIG. 5A shows directions of biasing forces P and P' of the return spring 35 when the key 21 is kept in the initial position and the struck position, respectively. FIG. 5B shows the direction of a radial load R by a self weight $W_1$ of the key 21. FIG. 5C shows the direction of a resultant force R" of the radial forces R and R' when a force W' acts on the key 21 after the key 21 is depressed to the lower limit and abuts against the lower stopper 31. FIG. 5D shows the direction of a resultant force R" when the force W' acts on a portion of the key 21 which is located behind the lower stopper 31. In this case, since the resultant force R" changes within the range of 0° to 180°, the bearing portion 23 can apparently have a substantially semicircular shape. When the bearing portion 23 has an arcuated shape extending within the range of 0° to 180°, the bearing portion 23 can be detachably mounted on the pivot member 26. The keys can be removed from the pivot member 26 independently of each other even if only one shaft is provided as a pivot member for all keys, thereby greatly improving the assembly operation. The direction in which the bearing portion 23 can be removed from the pivot member 26 opposes the direction of the radial load generated between the corresponding key and the pivot member 26 during musical performance. Therefore, in normal musical performance, the bearing portion 23 will not be separated from the pivot member 26, thereby assuring stable striking operation of the keys.

In addition, the arcuated bearing portion 23 need not be moved along the axial direction of the pivot member 26 when the bearing portion 23 is removed therefrom. It is therefore possible to add a function to the pivot mechanism for preventing the keys from being moved along the axial direction of the pivot member, as shown in FIGS. 6 and 7.

Figure 6:
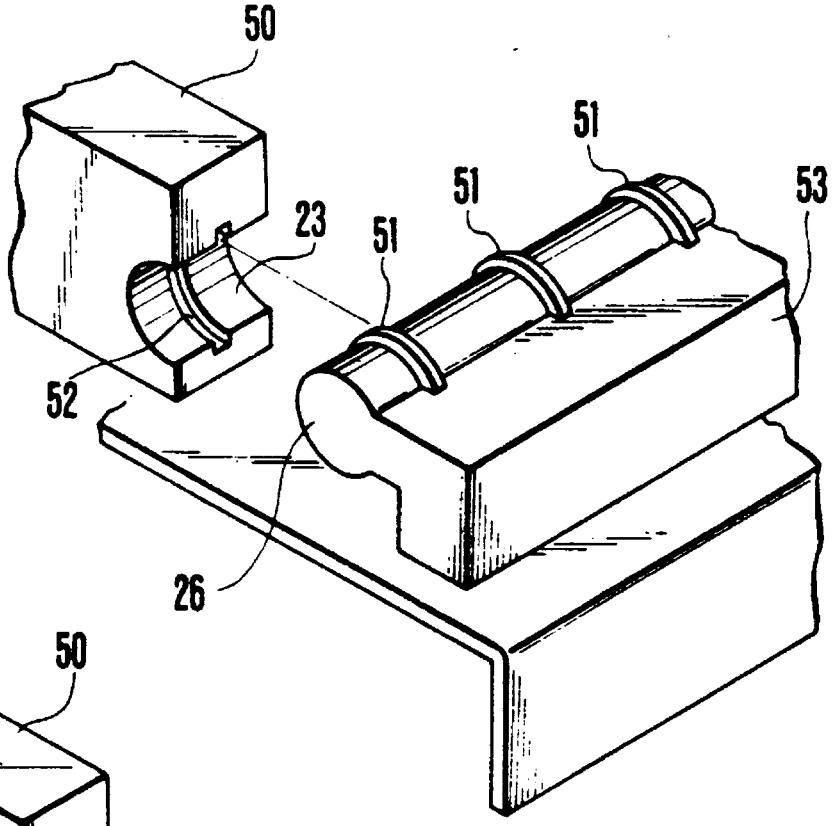
FIGS. 6 and 7 are enlarged perspective views showing pivot members and back end portions (i.e., bearing portions) slidably contacting the corresponding pivot members in keyboard devices of an electronic musical instrument according to still other embodiments of the present invention, respectively.

FIG. 6 shows a third embodiment of the present invention. Annular projections 51 each of which corresponds to a key 50 are integrally formed on the outer surface of a pivot member 26. A fitting groove 52 of each key 50 can receive the corresponding annular 1 projection 51. In this case, the pivot member 26 is formed as a single common shaft to mount all or plural keys thereon. [The pivot member 26 is integrally formed with an L-shaped leg portion 53.] The leg portion 53 is fixed by screws on the keyboard frame 1. *Alternatively, the leg portion 53 may be movably inserted in a hole formed in the keyboard frame 1.*

Figure 7:
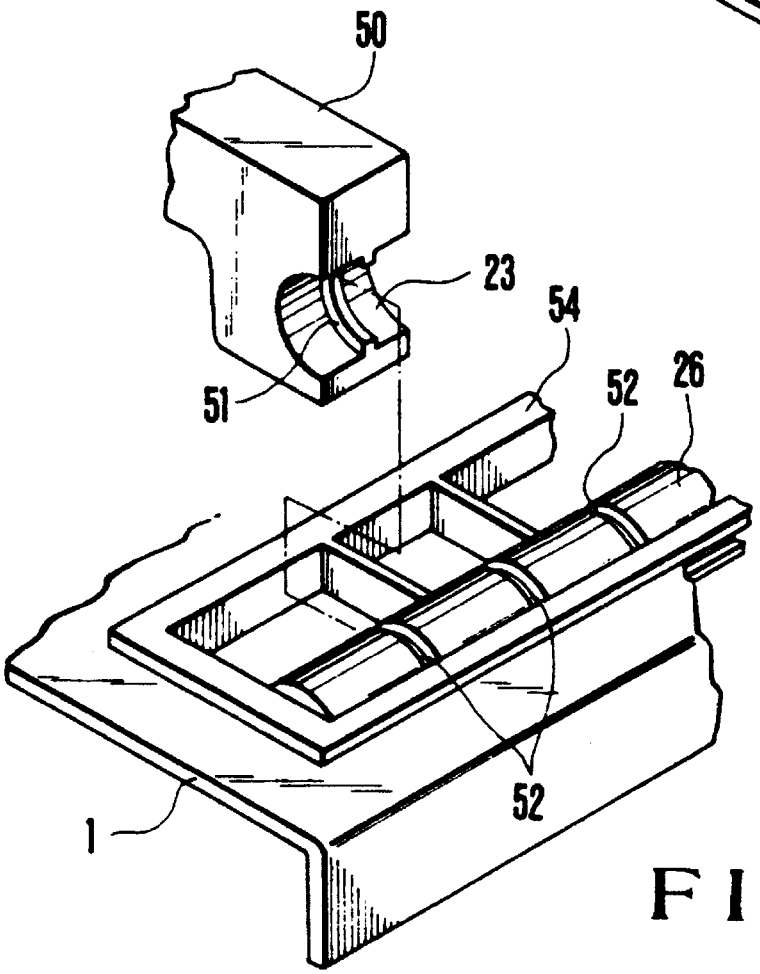

In a fourth embodiment shown in FIG. 7, a pivot member 26 is inserted in the keyboard frame 1 and is then formed integrally therewith. A plurality of fitting grooves 52 are formed in the pivot member 26. A projection 51 is formed in the bearing portion 23 of each key 50 and can be fitted in the corresponding fitting groove 52. It should be noted that the pivot member 26 is formed integrally with a frame 54.

Figure 8:
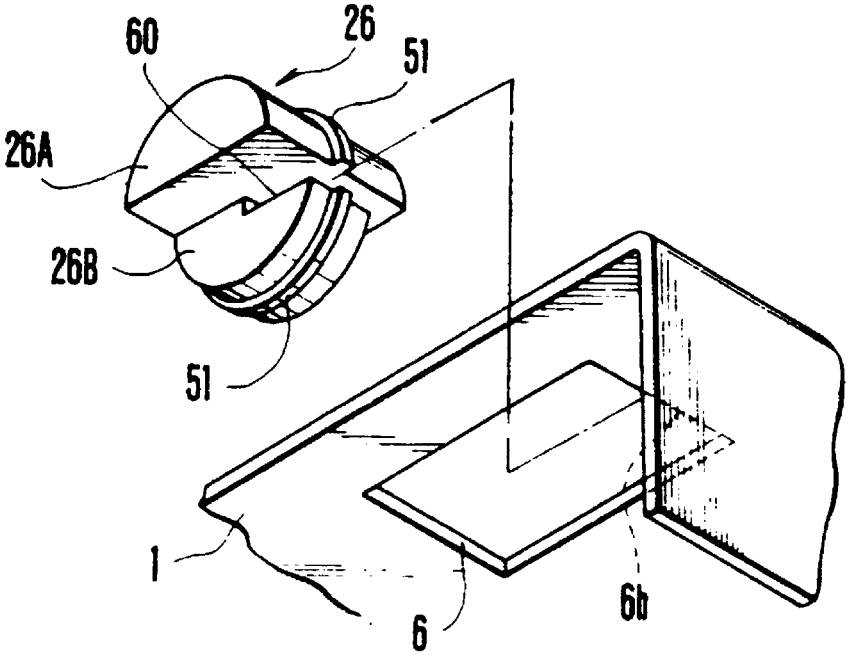
FIG. 8 is a perspective view showing a positional relationship between a pivot member of a keyboard device and a keyboard frame according to still another embodiment of the present invention.

FIG. 8 is a perspective view showing a pivot member according to a fifth embodiment of the present invention. The pivot members 26 are provided for the respective keys. The pivot member 26 comprises an upper semicircular half 26A and a lower semicircular half 26B. The lower semicircular half 26B has the same radius as the upper semicircular half 26A, and a width smaller than that of the upper semicircular half 26A. A groove 60 is formed between the upper and lower semicircular halves 26A and 26B. A back edge 6b defining of a rectangular through hole 6 is fitted in the groove 60. Semiannular projections 51 are respectively formed on the outer surfaces of the upper and lower semicircular halves 26A and 26B along their circumferential direction. The semiannular projections 51 serve to prevent lateral movement of the corresponding key along the axial direction of the pivot member 26. The upper semicircular half 26A extends along the longer sides of the through hole 6, thereby reinforcing the mechanical strength of the corresponding portions of the frame.

Figure 9A:
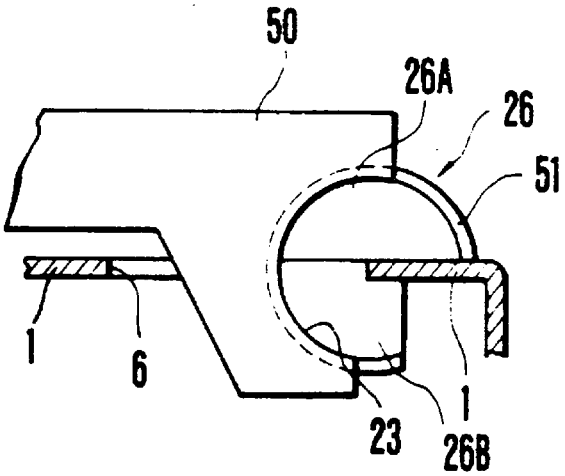
FIGS. 9A and 9b are respectively a sectional view and a side view of a pivot structure of a keyboard device according to still another embodiment of the present invention.
Figure 9B:
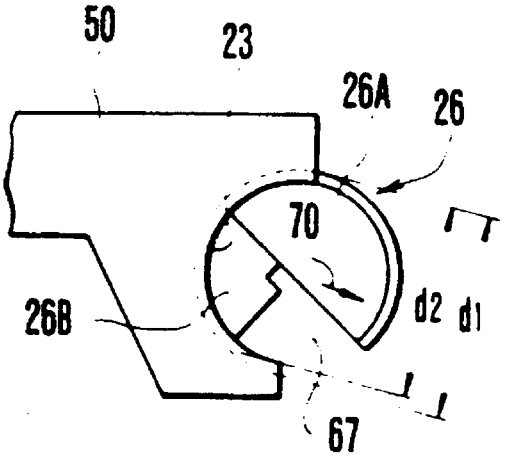

FIGS. 9A and 9B are a sectional view and a side view which show the main part of a keyboard device according to a sixth embodiment of the present invention. This embodiment resembles the fifth embodiment shown in FIG. 8. The pivot mechanism of the sixth embodiment is substantially the same as that of the fifth embodiment, except that a back half portion of the lower semicircular half 26B is omitted. Therefore, a pivot member 26 has a section having an angle of about 270°. A bearing portion 23 of a key 50 comprises [a circular] *an arcuate* portion falling within the range of about 0° to 200°. The reason why the pivot member 26 comprises [¾ circular] *arcuate* portions lies in that the bearing portion 23 can then be easily mounted/removed with respect to the pivot member 26 even if the bearing portion 23 comprises [the circular] *an arcuate* portion of 180° or more.

In the state shown in FIG. 9A, the bearing portion 23 covers more than half of the surface of the pivot member 26, so that the distance between the upper and lower edges of the bearing portion 23 is slightly shorter than a diameter of the pivot member 26. For this reason, a considerably large force is required to remove the bearing portion 23 from the pivot member 26. However, as shown in FIG. 9B, when the pivot member 26 is pivoted through about 45° so as to locate a notch 67 of the pivot member 26 downward (or upward), the pivot member 26 can be easily removed from the bearing portion 23 upon being pulled in a direction indicated by an arrow 70 due to a difference between distances $d_1$ and $d_2$ even if the bearing portion 23 has an angle of 180° or more. The pivot member 26 can also be easily mounted in the beating portion 23 when the pivot member 26 is inserted in the direction opposite to the direction indicated by the arrow 70 while the posture of the pivot member 26 is left unchanged. The pivot member 26 fired with the bearing portion 23 is mounted and fixed in the through hole 6 of the keyboard frame 1.

Figure 10:
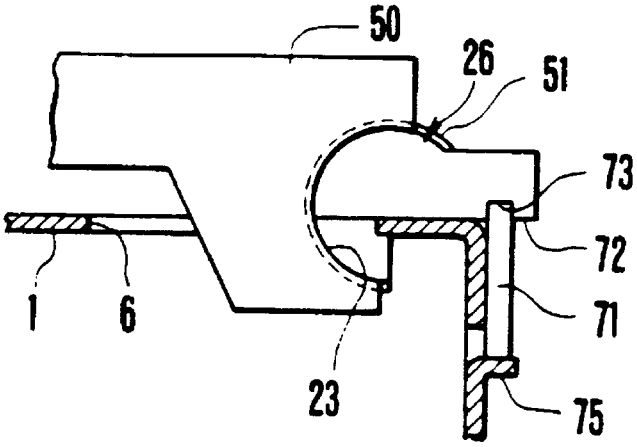
FIG. 10 is a sectional view showing a pivot structure of a keyboard device according to still another embodiment of the present invention.

FIG. 10 shows a seventh embodiment of the present invention. The pivot mechanism of this embodiment resembles that of the sixth embodiment. According to the seventh embodiment, an upper end of a lock piece 71 mounted on the rear surface of the keyboard frame 1 is engaged in a recess 73 formed in a lower surface 72 of an extended portion of a pivot member 26. Therefore, the pivot member 6 will not be removed from the through hole 6. The lock piece 71 can be fixed on the keyboard frame 1 by a proper means such as a screw. In the fifth, sixth and seventh embodiments, each pivot member corresponds to each one of the keys. However, when the pivot member 26 has a length corresponding to all or plural keys, only one pivot member is required for all or plural keys. The lock piece 71 is supported or a bent portion 75 of the frame 1. However, the lock piece 71 may be simply fixed by a screw on the rear surface of the frame 1.

Figure 11:
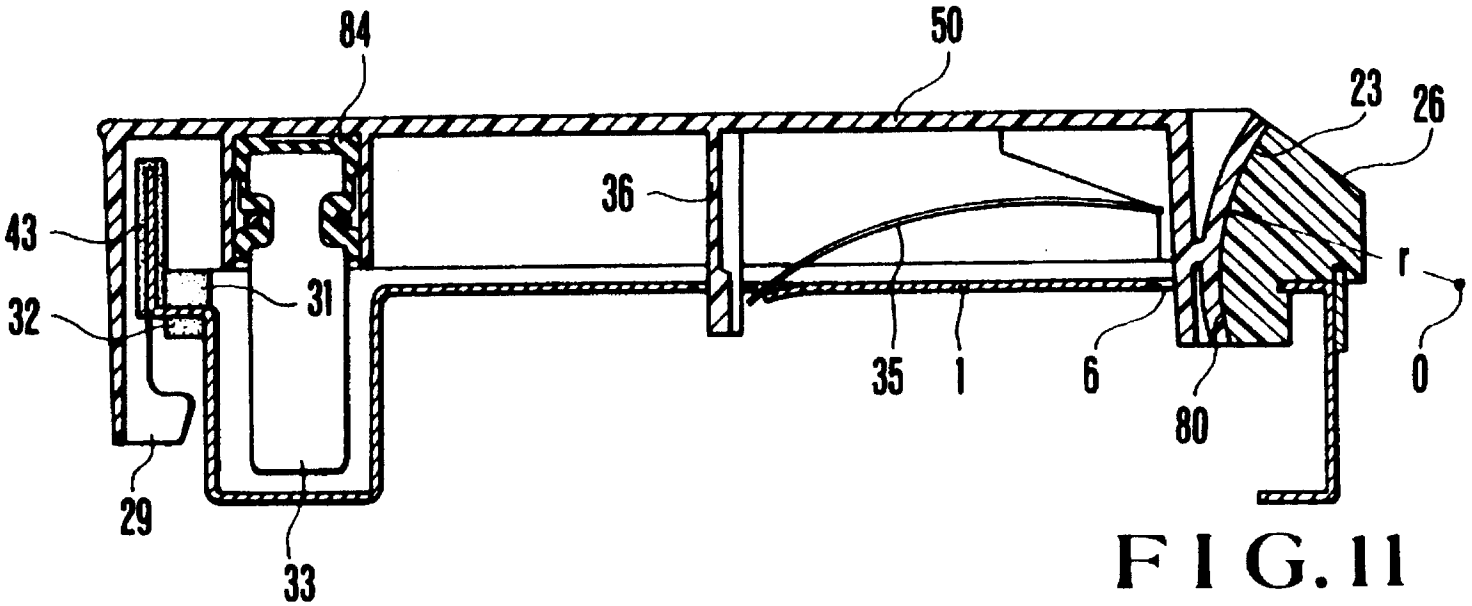
FIGS. 11 and 12 and respectively a longitudinal sectional view and a side view of a keyboard device according to still another embodiment of the present invention.

FIG. 11 shows an eighth embodiment of the present invention. According to this embodiment, a pivot member 26 with [a circular] *an arcuate* surface 80 having a considerably large radius r is used so as to cover the range (FIG. 4) of changes in radial load by means of the [circular] *arcuate* surface 80. A bearing portion 23 of a key 50 has [a circular] *an arcuate* surface which is adapted to fit with the [circular] *arcuate* surface 80.

When the radius r of curvature of the pivot member 26 is increased, the bearing portion 23 is apart by a predetermined distance from an imaginary pivot center O about which the key 50 is pivoted. Therefore, the overall length of the key 50 can be shortened by the predetermined distance. Although the conventional key is long enough to obtain smooth movement and a proper key touch, the key 50 of this embodiment can provide smooth key movement and a good key touch even if the key 50 has a short length. This is because the pivot member 26 comprises the circular surface 80 having a long radius of curvature to increase the contact area between the pivot member 26 and the bearing member 23. In addition, since the key 50 is short, the material cost can be decreased. A length of the keyboard frame 1 along the key alignment direction can be shortened.

Figure 12:
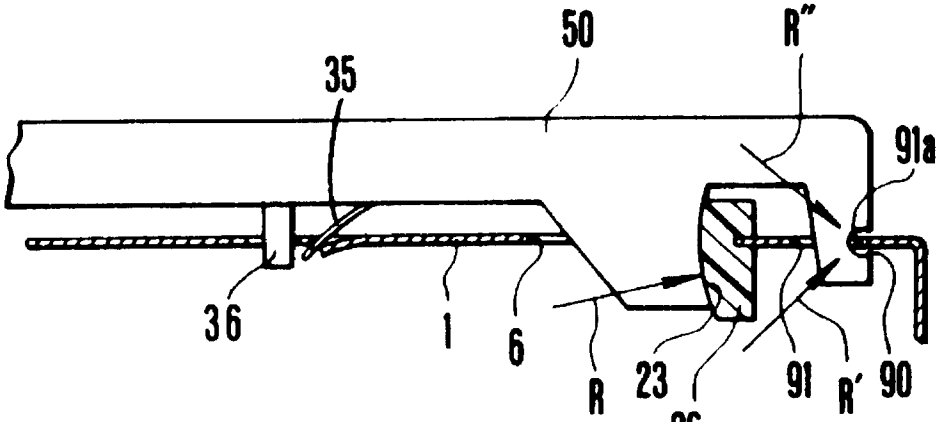

FIG. 12 shows a ninth embodiment of the present invention. A bearing portion 23 is located on the lower surface of an intermediate portion of a key 50. A recess 90 is formed at the lower portion of the back end face. A back end portion 91a which defines a hole 91 formed in a keyboard frame 1 is inserted in the recess 90 without contacting the portion 91a with portions defining the recess 90. The center of pivotal movement of the key 50 is located at the center of the recess 90. A radial load R in the normal key striking operation acts on the pivot member 26. A force R" greater than the normal striking force R acts on the portions defining the recess 90 and the back end portion 91a. In this ease, the key 50 will not pivot when the force R' or R" is generated, so that the frictional characteristic between the back end portion 91a and the portions deeming the recess 90, and the shapes thereof need not be considered.

In the pivot mechanism having the above-mentioned structure wherein the pivot member 26 is smoothly brought into slidable contact with the bearing portion 23, the key 50 can be smoothly moved, thereby improving the key touch.

In the above embodiments, the keyboard devices are applied to the white keys. However, any one of the keyboard devices can be applied to a black key. In this case, the black key is shorter than the white key, so that an arcuated contact portion between the pivot member and the bearing portion is preferably smaller than that in the white key so as to provide a good key touch. Any other means for decreasing a contact area can also be utilized.

A buckling spring is used as the return spring in any one of the above embodiments. However, the buckling spring may be replaced with a known coil spring.

In the keyboard devices of the embodiments described above, [a circular or] *the* sector-shaped pivot member is mounted in a keyboard frame, and [a semicircular] *an arcuate* bearing portion which slidably contacts the pivot member is provided, thereby obtaining the pivot mechanism between the pivot member and the bearing portion. Therefore, the key can be smoothly moved with a good touch. Since the key can be easily removed from or mounted on the pivot member, the pivot members can be respectively used for keys or only one pivot member can be used for all the keys. In addition, the durability of the sliding surfaces is improved, thereby providing a long service life of an electronic musical instrument.

Furthermore, when the inertia weight is mounted on the lower surface of the front end portion of the key, a better touch can be obtained.

FIGS. 13 to 16 show further embodiments of the present invention. In each embodiment, a slidable contact portion between a pivot member and a bearing portion formed in a back end portion of the key is formed inside the key in the vicinity of the back end portion thereof. In this case, the bearing portion formed in the key is constituted by a circular, elliptical, or arcuated hollow portion extending across the key. The pivot member comprises a cylindrical member which can be fitted in the hollow portion. The embodiments will be described with reference to FIGS. 13 to 16.

Figure 13:
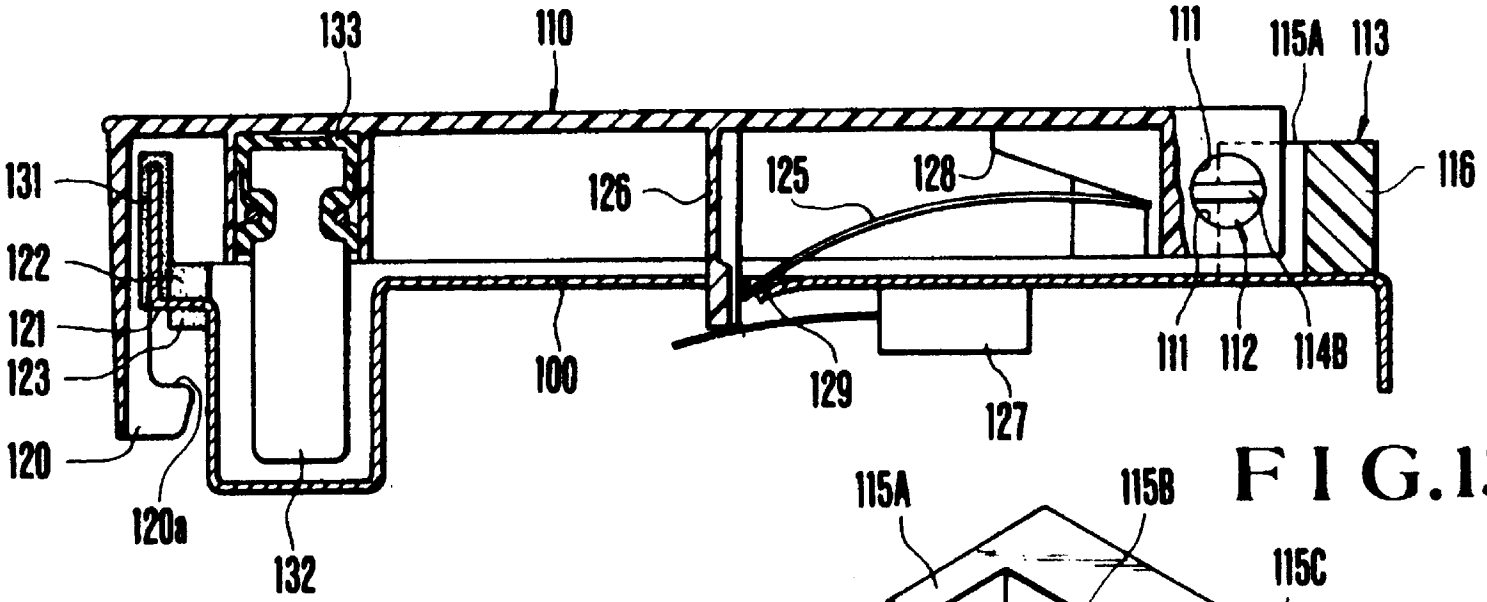
FIG. 13 is a longitudinal sectional view of a keyboard device according to still another embodiment of the present invention.
Figure 14:
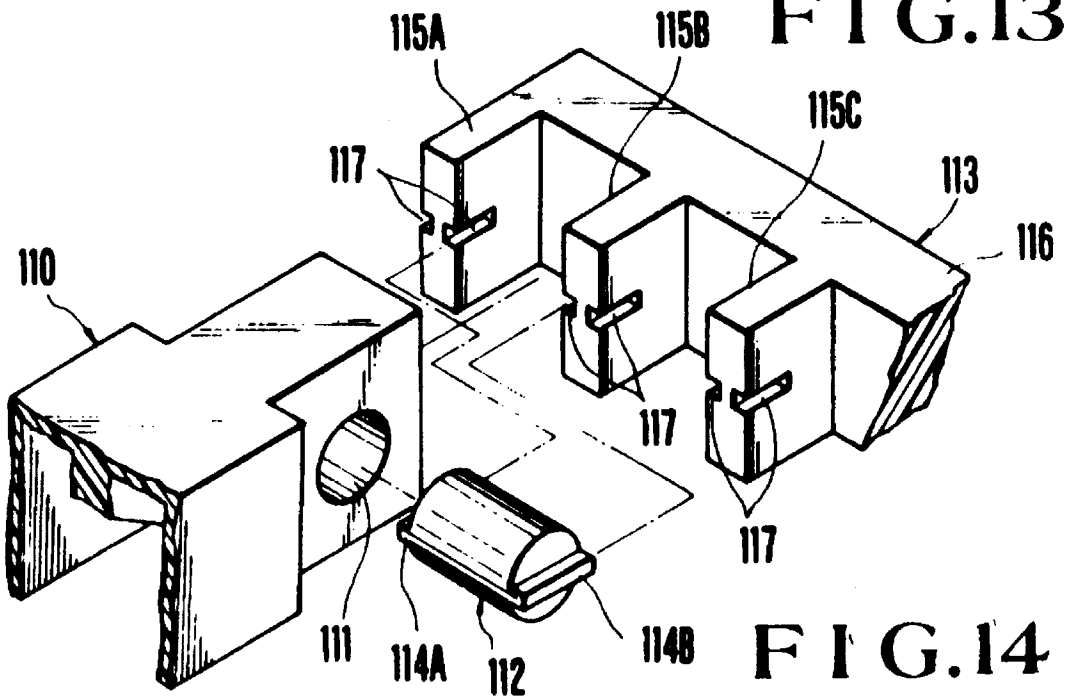
FIG. 14 is an exploded perspective view of a pivot structure of the keyboard device shown in FIG. 13.

FIGS. 13 and 14 show a keyboard device according to a tenth embodiment of the present invention. Reference numeral 110 denotes a key integrally formed by a synthetic resin. The key 110 has a recess in its lower surface and has a substantially U-shaped section. A bearing hole 111 is formed in a back end portion of the key 110 so as to extend across the key along its width-wise direction.

A support shaft 112 can be inserted in the bearing hole 111 and can be supported by a support shaft holding member 113 at its two ends. The key 110 is supported to be vertically pivotal about the support shaft 112. The support shaft 112 has substantially the same length as the width of the back end portion of the key 110. The support shaft 112 has engaging portions 114A and 114B at its two ends. The engaging portions 114A and 114B comprise radially extending linear projections, respectively. Therefore, when the support shaft 112 is inserted in the bearing hole 111, the engaging portions IRA and 114B extend outward from the long sides of the key 110.

The support shaft holding member 113 commonly supports all support shafts 112 of the keys 110 and is formed by a synthetic resin in a comb-like shape. The holding member 113 has a plurality of support walls 115A, 115B, 115C, . . . which are equidistantly formed to extend from a connecting portion 116 in a direction to oppose the back end portion of the key 110. The holding member 113 is disposed on the upper surface of the back end portion of a keyboard frame 100.

In this case, the holding member 113 is fixed by screws on the keyboard from 100. However, the holding member 113 can be detachably mounted by proper engaging pieces on the keyboard frame 100 or can be inserted in the [holding member 113] *keyboard frame 100* to constitute an integral frame assembly. Two engaging portions 117 which comprise engaging grooves are respectively formed at central portions of the side surfaces of each of the support walls 115A, 115B, 115C, . . . and respectively correspond to the the engaging portions 114A and 114B. The engaging portions 117 are substantially horizontally formed in two side surfaces of each of the support walls 115A, 115B and 115C from its front end face to extend by a length corresponding to that of the engaging portions 114A and 114B. The distance between the two adjacent support walls 115A, 115B, 115C, . . . corresponds to the width of the back end portion of each key 110 (white or black key).

A substantially L-shaped stopper 120 integrally depends from the lower surface of the front end portion of the key 110. The lower end of the stopper 120 is lower than a lower surface 121 of a front end portion of the keyboard frame 100. A lower limit stopper 122 and an upper limit stopper 123 are respectively mounted on the upper and lower surfaces of the front end portion of the keyboard frame 100 so as to limit the vertical movement of the key 110. FIG. 13 shows a state wherein the lower surface of the front end portion of the key 110 is about to abut against the lower limit stopper 122 when the key 110 is struck. When the key 110 is biased by a return spring 125 (to be described in detail later), a surface 120a of the stopper 120 abuts against the upper stopper 123, so that the key 110 returns to the initial position or nonstruck position. When the key 110 is struck against the biasing force of the return spring 125, an actuator 126 integrally formed with the key 110 actuates a key switch 127 fixed on the lower surface of the keyboard frame 100, thereby electrically generating a tone corresponding to this key 110.

A spring seat wall 128 is integrally formed with an inner side wall portion in the vicinity of the back end portion of the key 110. The back end of the return spring 125 is stopped by the wall 128. The front end of the return spring 125 is stopped by a stopper portion 129 formed on the upper surface of the keyboard frame 100. The return spring 125 comprises a leaf spring obtained by punching a metal plate having a proper thickness. The return spring 125 is buckled between the key 110 and the keyboard frame 100. Therefore, the return spring 125 is buckled in an arcuated shape, as shown in FIG. 13. The biasing force of the spring 125 acts on the key 110 clockwise and backward. Reference numeral 131 denotes a key guide integrally formed with the front end of the keyboard frame 100 to regulate the lateral movement of the key 110; and 132, an inertia weight mounted through a gasket 133 on the lower surface of the front end portion of the key 110 so as to obtain the same key touch as in the conventional, mechanical piano.

In the keyboard device having the construction described above, the support shaft 112 supports the corresponding key 110, so that the key can be stably and smoothly struck. In addition, the support shaft 112 is mounted in each key 110 and is held by the engaging portions 117 of the holding member 113. Therefore, when the engaging portions 114A and 114B are respectively disengaged from the corresponding engaging portions 117 of the holding member 113, the corresponding key 110 can be removed from the holding member 113 independently of other keys, thereby achieving one-to-one correspondence between the keys and the support shafts. In addition to this advantage, the support shaft 112 can be easily removed from or mounted in the corresponding key 110 and the holding member 113. The key 110 is biased backward by the return spring 125, as described above, so that the support shaft 112 will not be separated from the holding member 113 during normal musical performance, thereby providing stable striking operation of the keys. The walls 115A, 115B, 115C, . . . have a function for preventing the keys 110 from being laterally moved.

Figure 15:
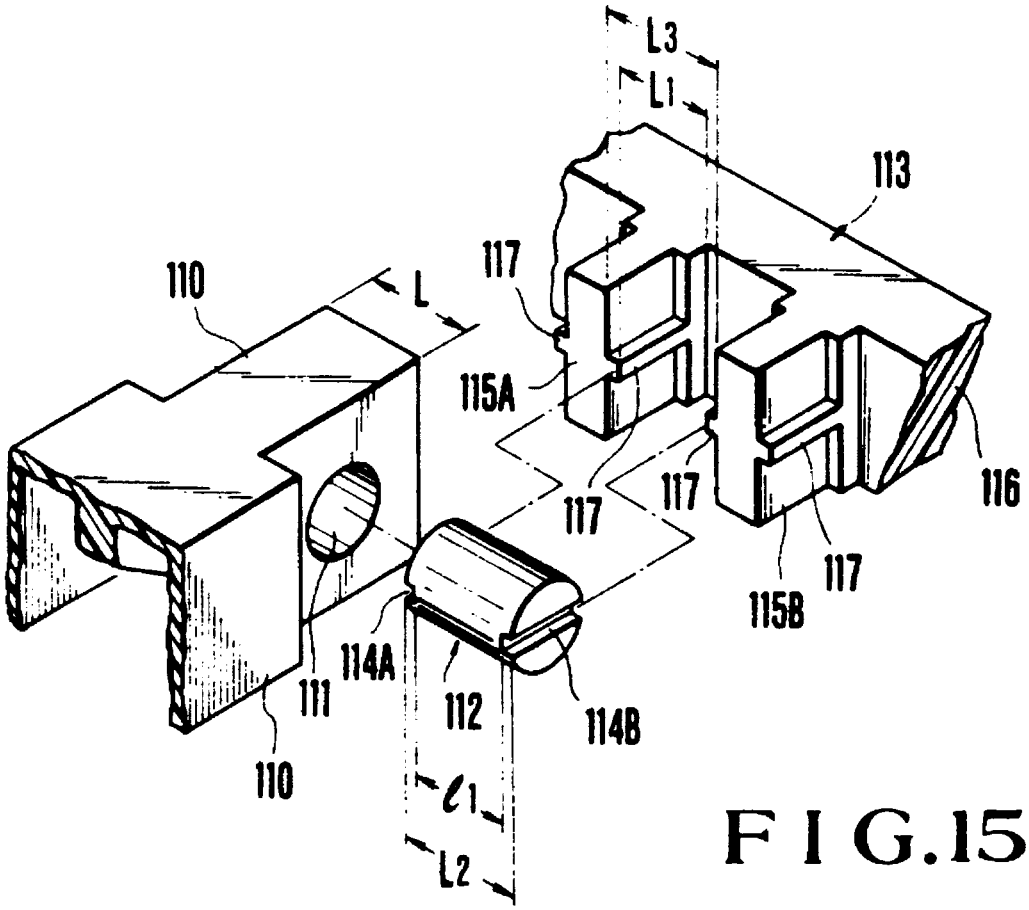
FIGS. 15 and 16 are exploded perspective views showing pivot structures of keyboard devices according to still other embodiments of the present invention, respectively.

FIG. 15 shows an eleventh embodiment of the present invention. Engaging portions 114A and 114B are formed at two ends of a support shaft 112. The engaging portions 114A and 114B comprise radially elongated grooves. Engaging portions 117 which comprise linear projections are integrally formed on side surfaces of each of support walls 115A, 115B, . . . of a support shaft holding member 113 and correspond to the engaging portions 114A and 114B, respectively. In this case, a distance $I_l$ between the engaging portions 114A and 114B is substantially the same as a width L of the back end portion of the key 110 and is slightly shorter than a distance $L_1$ between the corresponding pair of engaging portions 117. An overall length $L_2$ of the support shaft 112 is slightly shorter than a distance $L_3$ between the adjacent support walls 115A and 115B.

Figure 16:
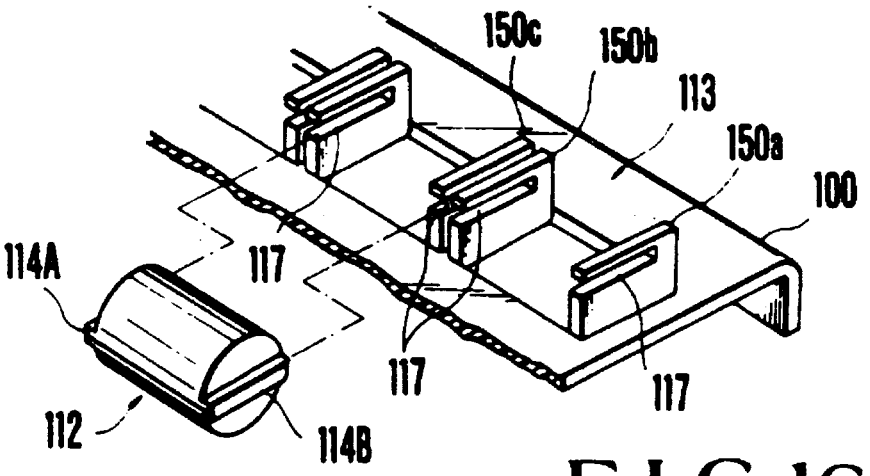

FIG. 16 shows a twelfth embodiment of the present invention. A support shaft holding member 113 comprises a plurality of bent portions 150a, 150b, 150c, . . . of a keyboard frame 100. Engaging portions 114A and 114B which comprise linear projections are respectively formed on two end faces of a support shaft 112. Engaging portions 117 which comprise elongated grooves are formed in the bent portions 150a, 150b, 150c, . . . respectively. In this case, the support shaft holding member 113 can be integrally formed with the keyboard frame 100, so that the number of component parts can be decreased, thereby further improving assembly operation.

In each of the tenth, eleventh and twelfth embodiments described above, the engaging portions 114A and 114B and the engaging portions 117 are horizontally formed. However, the engaging portions are not limited to this configuration. They can be vertically formed to obtain the same effect as in the above embodiments.

As shown in FIG. 16, the bent portions 150b and 150c are adjacent to each other. However, one bent portion can be commonly used for the engaging portion 114A and the engaging portion 114B adjacent thereto. Assume that only the bent portion 150b is used in FIG. 16. The height of the engaging portion 114A of the support shaft 112 is set to be greater than a thickness of the bent portion 150b. In this case, an engaging portion 114B comprises an elongated groove. When the engaging portion 114A is fitted in the corresponding groove of the bent portion 150b, the engaging portion 114A extends outward toward the adjacent key. The extended portion is then fitted in the engaging portion 114B of the next support shaft. Therefore, the thickness of the bent portions can be decreased to be less than ½ the original thickness, as compared with the structure shown in FIG. 16. As a result, the notch need not be formed in the back end portion of the key unlike the cases shown in FIGS. 14 and 15. The above-described function can be achieved such that the engaging portions 117 as grooves shown in FIG. 16 are replaced with a recess and a projection which are formed by drawing on two side surfaces, respectively, and that the projection of the support shaft is fitted in the recess of the bent portion and the projection of the bent portion is fitted in the groove of the support shaft.

As described in the embodiments with reference to FIGS. 13 to 16, the engaging portions are formed on two end faces of the support shaft which is inserted in the bearing hole of the key and pivotally supports the key, and these engaging portions are fitted with the engaging portions of the support shaft holding member on the keyboard frame. Therefore, the key can be smoothly moved with a good touch. In addition, the support shaft can be easily removed from the key and the support shaft holding member, thereby achieving one-to-one correspondence between the key and the support shaft and greatly improving assembly operation.

What is claimed is:

1. A keyboard device of an electronic musical instrument, comprising:

a keyboard frame; a plurality of keys, which are aligned on said keyboard frame, and which are vertically pivotable, wherein each key of said plurality of keys, has a longitudinal axis and [a semi-circular] *an arcuate* surface at a back end portion thereof having a radius of curvature lying in a vertical plane passing through said longitudinal axis of said *each* key, a plurality of return springs each of which corresponds to one of said keys [and has one end stopped by said key and the other end stopped by said keyboard frame so as to bias] *biases its* said [key] *corresponding one of said keys* toward a nonstruck position; and a plurality of pivot members each of which *corresponds to one of said keys and* is disposed on said keyboard frame at an end of [a] *said* corresponding one of said plurality of keys on said longitudinal axis of each of said keys, each of said plurality of pivot members having [a semicircular] *an arcuate* surface *forming a continuous bearing portion* which is in slidable contact with said back end portion of said corresponding one of said keys, so as to allow each of said keys to perform pivotal movement,

*said each of said plurality of pivot members being immovably fixed to said keyboard frame when said corresponding one of said keys is struck and performs pivotal movement,* said back end portion of each of said keys being spring-biased against said [semi-circular] *arcuate* surface of [said pivot member] *its said corresponding pivot member* by means of [said return spring] *its said corresponding return spring*.

2. A device according to claim 1, wherein [said return spring] *each of said return springs* engages with a portion of [said key] *its said corresponding one of said keys* which is located behind a portion of said keyboard frame stopping [the other] g *an* end of [the return spring] *said each of said return springs* so as to apply a biasing force to hold said back end portion of [the key] *said corresponding one of said keys* against said [semi-circular] *arcuate* surface of [the] *its said corresponding* pivot member.

3. A device according to claim 1, where there is further provided an L-shaped member behind said back end portion of said *each* key, a distal end of said L-shaped member being movably inserted in a hole formed in said keyboard frame.

4. A device according to claim 1, wherein said *each* key has *corresponding* a weight member, said *corresponding* weight member being secured to *its* said *corresponding each* key by means of a *corresponding* damper member, at a front end portion opposite to said back end portion.

5. A device according to claim 4, wherein *each* said *corresponding* weight member is mounted in a vicinity of the front end portion of *its* said *corresponding each* key which is located in front of a stopper portion of said keyboard frame which stops [said return spring] *said corresponding return spring*.

6. A device according to claim 1, wherein said *each* key has a *corresponding* weight member, said *corresponding* weight member, a stopper portion of said keyboard frame which stops said *corresponding* return spring, and a stopper portion of said *each* key which stops said *corresponding* return spring being arranged from a front end portion of said *each* key to said back end portion of said *each* key in the order named.

7. A device according to claim 1, wherein said *each* pivot member is fixed at a keyboard frame portion which defines[,] a back edge of a hole formed in said keyboard frame, and said [semi-circular] *arcuate* surface *of said each pivot member* is formed by a combination of an upper [semicircular] *arcuate* portion and a lower [semicircular] *arcuate* portion having the same radius as that of said upper [semicircular] *arcuate* portion and a width smaller than that of said upper [semicircular] *arcuate* portion, and has a groove between said upper [semicircular] *arcuate* portion and said lower [semicircular] *arcuate* portion, said groove receiving said keyboard frame portion.

8. A device according to claim 1, wherein said back end portion of said *each* key has a bearing portion which is brought into [solidable] *slidable* contact with said [semi-circular] *arcuate* surface of *its* said *corresponding* pivot member, said bearing portion being formed in an inner portion of an extended portion extending downward from said back end portion of said *each* key.

9. A device according to claim 8, wherein said *each* return spring engages with a portion of [said key] *its said corresponding one of said keys* which is located in front of a stopper portion of said keyboard frame which stops said *each* return spring so as to apply a biasing force to hold said bearing portion of *its* said [key] *corresponding one of said keys* against said [semi-circular] *arcuate* surface of *its* said *corresponding* pivot member.

10. A device according to claim 1, wherein said [semi-circular] *arcuate* surface *of said each key* includes a bearing portion which is brought into slidable contact with *its* said *corresponding* pivot member disposed at said back end portion of said *each* key; and regulating means, formed on opposing surfaces of said [circular] *arcuate* surface of said *corresponding* pivot member and said bearing portion, respectively, for regulating lateral movement of said key in cooperation with each other.

11. A device according to claim 10, wherein said regulating means comprises a combination of a projection and a recess.

[12. A keyboard device of an electronic musical instrument, comprising:

a keyboard frame;

a plurality of keys which are aligned on said keyboard frame and which are vertically pivotable;

a plurality of return springs each of which corresponds to one of said keys and has one end stopped by said key and the other end stopped by said keyboard frame so as to bias said key toward a non-struck position;

a plurality of pivot members each of which is disposed on said keyboard frame at an end of a longitudinal axis of said key to correspond to one of said keys, and has a circular surface to be brought into slidable contact with a back end portion of said key so as to allow said key to perform pivotal movement;

said back end portion of said key being spring-biased against said circular surface of said pivot member by means of said return spring; and wherein said back end portion of the key has a bearing portion which is brought into slidable contact with said circular surface of said pivot member, said bearing portion being formed in an inner portion of an extended portion extending downward from said back end portion of said key;

wherein said return spring engages with a portion of said key which is located in front of a stopper portion of said keyboard frame which stops said return spring so as to apply a biasing force to hold said bearing portion of said key against said circular surface of said pivot member; and wherein a vertical wall is formed at a back end of said keyboard frame, and a lock member is inserted between said vertical wall and said back end portion of said key to prevent said bearing portion from being removed from a hole formed in said keyboard frame.]

[13. A keyboard device of an electronic musical instrument, comprising:

a keyboard frame;

a plurality of keys which are aligned on said keyboard frame and which are vertically pivotable;

a plurality of return springs each of which corresponds to one of said keys and has one end stopped by said key and the other end stopped by said keyboard frame so as to bias said key toward a non-struck position;

a plurality of pivot members each of which is disposed on said keyboard frame at an end of a longitudinal axis of said key to correspond to one of said keys, and has a circular surface to be brought into slidable contact with a back end portion of said key so as to allow said key to perform pivotal movement;

said back end portion of said key being spring-biased against said circular surface of said pivot member by means of said return spring; and wherein said pivot member is fixed at a keyboard frame portion which defines a back edge of a hole formed in said keyboard frame, has said circular surface formed by a combination of an upper semicircular portion and a lower semiconductor portion having the same radius as that of said semi-circular portion and a width smaller than that of said upper semicircular portion, and has a groove between said upper semicircular portion and said lower semicircular portion, said groove receiving said keyboard frame portion.Θ

[14. A device according to claim 13, wherein said lower semicircular portion has a substantially ½ circular shape.

[15. A device according to claim 13, wherein said lower semicircular portion has a substantially ¼ circular shape.]

[16. A device according to claim 15, wherein a bearing portion formed at said back end portion of said key and slidably contacting with said pivot member has a concave circular surface portion to contact said pivot member, said concave circular surface portion having a central angle falling within a range of not less than 180°.]

[17. A keyboard device of an electronic musical instrument, comprising:

a keyboard frame;

a plurality of keys which are aligned on said keyboard frame and which are vertically pivotable;

a plurality of return springs each of which corresponds to one of said keys and has one end stopped by said key and the other end stopped by said keyboard frame so as to bias said key toward a non-struck position;

a plurality of pivot members each of which is disposed on said keyboard frame at an end of a longitudinal axis of said key to correspond to one of said keys, and has a circular surface to be brought into slidable contact with a back end portion of said key so as to allow said key to perform pivotal movement;

said back end portion of said key being spring-biased against said circular surface of said pivot member by means of said return spring; and wherein said pivot member is fixed at a keyboard frame portion which defines a back end of a hole formed in said keyboard frame, and a lock member extends to close said hole so as to prevent said back end portion of said key, which is partially fitted in said hole, from being removed from said]

[18. A device according to claim 17, wherein said plurality of pivot members are connected to a common member for all of said keys.]

[19. A device according to claim 17, wherein said circular surface has different curvature in accordance with white and black keys.]

[20. A keyboard device of an electronic musical instrument, comprising:

a keyboard frame;

a plurality of keys which are aligned on said keyboard frame and which are vertically pivotable;

a plurality of return springs each of which corresponds to one of said keys and has one end stopped by said key and the other end stopped by said keyboard frame so as to bias said key toward a non-struck position;

a plurality of pivot members each of which is disposed on said keyboard frame at an end of a longitudinal axis of said key to correspond to one of said keys, and has a circular surface to be brought into slidable contact with a back end portion of said key so as to allow said key to perform pivotal movement;

said back end portion of said key being spring-biased against said circular surface of said pivot member by means of said return spring; and wherein said keyboard frame has a vertical wall bent downward at a back end thereof, said pivot member has an extended portion bent at said backward of said keyboard frame back end, and there is further provided a lock member disposed between a groove formed in said extended portion and a stopper portion formed in said vertical wall.]

[21. A keyboard device of an electronic musical instrument, comprising:

a keyboard frame;

a plurality of keys which are algined on said keyboard frame and which are vertically pivotable;

a plurality of return springs each of which corresponds to one of said keys and has one end stopped by said key and the other end stopped by said keyboard frame so as to bias said key toward a non-struck position;

a plurality of pivot members each of which is disposed on said keyboard frame at an end of a longitudinal axis of said key to correspond to one of said keys, and has a circular surface to be brought into slidable contact with a back end portion of said key so as to allow said key to perform pivotal movement;

said back end portion of said key being spring-biased against said circular surface of said pivot member by means of said return spring; and wherein said circular surface has such a large radius of curvature that an imaginary center of the curvature is located on an imaginary plane behind said keyboard frame.]

*22. A keyboard device of an electronic musical instrument, comprising:*

*a keyboard frame;*

*a plurality of keys, which are aligned on said keyboard frame, and which are vertically pivotable, wherein each key of said plurality of keys has an arcuate surface at a back end portion of said each key,*

*a plurality of return springs, each of which corresponds to one of said plurality of keys and biases its said corresponding one of said keys toward a nonstruck position;*

*a plurality of pivot members, each of which corresponds to one of said keys and is disposed on said keyboard frame at an end of said corresponding one of said plurality of keys, each of said plurality of pivot members having an arcuate surface which is in slidable contact with said back end portion of said corresponding one of said plurality of keys, so as to allow each of said plurality of keys to perform pivotal movement,*

*said each of said plurality of pivot members being immovably fixed to said keyboard frame when said corresponding one of said plurality of keys is struck and performs pivotal movement,*

*said back end portion of each of said plurality of keys being spring-biased against said arcuate surface of its said corresponding one of said plurality of pivot members by means of its said corresponding one of said plurality of return springs; and*

*regulating means, formed on opposing surfaces of said arcuate surface of each of said plurality of pivot members and said back end portion of said corresponding one of said plurality of keys, respectively, for regulating lateral movement of each of said plurality of keys in cooperation with each other.*

*23. A keyboard device of an electronic musical instrument, comprising;*

*a key pivotally supported on a key support member;*

*a return elastic member for applying a return force to bias said key in a non-operative state;*

*a pivot point portion having a predetermined width larger than a width of a sidewall of said key in a direction of width of said key and formed such that a sectional surface thereof parallel to a surface perpendicular to the direction of width within the predetermined width is an arcuate portion, respectively;*

*a pivot point abutment portion located behind a performance portion of said key and having an arcuate portion brought into slidable contact with said arcuate portion of said pivot point portion within the predetermined width, the arcuate portion of said pivot point abutment portion having the same radius of curvature as that of said arcuate portion of said pivot point portion;*

*a projection formed on a circumferential surface of said pivot point portion and said pivot point abutment portion along a circumferential direction of contact circumferential surface portions of said pivot point portion and said pivot point abutment portion; and*

*a fitting groove corresponding to said projection formed on the other circumferential surface.*

*24. A keyboard device of an electronic musical instrument, comprising:*

*a key pivotally supported by a key support member;*

*a return elastic member for applying a return force to bias said key in an inoperative state, wherein a first pivot*

*point portion whose section of a plane parallel to a flat surface pivoted upon depression of said key has an arcuate portion that is formed on said key support member;*

*a second pivot point portion having an arcuate sectional shape and brought into slidable contact with a circumferential surface of said arcuate portion of said first pivot point portion and is formed on a rear portion of said key, and wherein an arcuate sliding surface of said second pivot point portion slides and pivots along an arcuate sliding surface of said first pivot point portion upon pivotal movement of said key, and centers of said arcuate sliding surfaces of said first and second pivot point portions are located behind said rear end portion of said key.*

*25. A keyboard device of an electronic musical instrument, comprising:*

*a keyboard frame;*

*a plurality of keys which are aligned on said keyboard frame and which are vertically pivotable;*

*a plurality of return springs each of which corresponds to one of said keys and has one end stopped by its said corresponding one of said keys and an other end stopped by said keyboard frame so as to bias each said corresponding one of said keys toward a non-struck position;*

*a plurality of pivot members each of which corresponds to one of said keys and is disposed on said keyboard frame at an end of a longitudinal axis of said corresponding one of said keys, and has an arcuate surface to be brought into slidable contact with a back end portion of said corresponding one of said keys so as to allow each of said keys to perform pivotal movement;*

*said back end portion of each of said keys being spring-biased against said arcuate surface of its said corresponding pivot member by means of its said corresponding return spring; and*

*wherein said back end portion of said each key has a bearing portion which is brought into slidable contact with said arcuate surface of its said corresponding pivot member, said bearing portion being formed in an inner portion of an extended portion extending downward from said back end portion of said each key;*

*wherein each of said return springs engages with a portion of said corresponding one of said keys which is located in front of a stopper portion of said keyboard frame which stops said each of said return springs so as to apply a biasing force to hold said bearing portion of said corresponding one of said keys against said arcuate surface of its said corresponding pivot member; and*

*wherein a vertical wall is formed at a back end of said keyboard frame, and a lock member is inserted between said vertical wall and said back end portion of said each key to prevent said bearing portion from being removed from a hole formed in said keyboard frame.*

*26. A keyboard device of an electronic musical instrument, comprising:*

*a keyboard frame;*

*a plurality of keys which are aligned on said keyboard frame and which are vertically pivotable;*

*a plurality of return springs each of which corresponds to one of said keys and has one end stopped by its said corresponding one of said keys and an other end stopped by said keyboard frame so as to bias each said corresponding one of said keys toward a non-struck position;*

*a plurality of pivot members each of which corresponds to one of said keys and is disposed on said keyboard frame at an end of a longitudinal axis of said corresponding one of said keys, and has an arcuate surface to be brought into slidable contact with a back end portion of said corresponding one of said keys so as to allow each of said keys to perform pivotal movement;*

*said back end portion of each of said keys being spring-biased against said arcuate surface of its said corresponding pivot member by means of its said corresponding return spring; and*

*wherein each of said pivot members is fixed at a keyboard frame portion which defines a back edge of a hole formed in said keyboard frame, has said arcuate surface formed by a combination of an upper arcuate portion and a lower arcuate portion having the same radius as that of said arcuate portion and a width smaller than that of said upper arcuate portion, and has a groove between said upper arcuate portion and said lower arcuate portion, said groove receiving said keyboard frame portion.*

*27. A device according to claim 26, wherein said lower arcuate portion has a substantially ½ circular shape.*

*28. A device according to claim 26, wherein said lower arcuate portion has a substantially ¼ circular shape.*

*29. A device according to claim 28, wherein a bearing portion formed at said back end portion of said each key and slidably contacting with said corresponding pivot member corresponding to said each key has a concave arcuate surface portion to contact said corresponding pivot member, said concave arcuate surface portion having a central angle falling within a range of not less than 180°.*

*30. A keyboard device of an electronic musical instrument, comprising:*

*a keyboard frame;*

*a plurality of keys which are aligned on said keyboard frame and which are vertically pivotable;*

*a plurality of return springs each of which corresponds to one of said keys and has one end stopped by its said corresponding one of said keys and an other end stopped by said keyboard frame so as to bias each said corresponding one of said keys toward a non-struck position;*

*a plurality of pivot members each of which corresponding to one of said keys and is disposed on said keyboard frame at an end of a longitudinal axis of its said corresponding one of said keys, and has an arcuate surface to be brought into slidable contact with a back end portion of said corresponding one of said keys so as to allow each of said keys to perform pivotal movement;*

*said back end portion of each of said keys being spring-biased against said arcuate surface of its said corresponding pivot member by means of its said corresponding return spring; and*

*wherein said each pivot member is fixed at a keyboard frame portion which defines a back end of a hole formed in said keyboard frame, and a lock member extends to close said hole so as to prevent said back end portion of said its corresponding one of said keys, which is partially fitted in said hole, from being removed from said hole.*

*31. A device according to claim 30, wherein said plurality of pivot members are connected to a common member for all of said keys.*

*32. A device according to claim 30, wherein said arcuate surface has different curvature in accordance with white and black keys.*

*33. A keyboard device of an electronic musical instrument, comprising:*

*a keyboard frame;*

*a plurality of keys which are aligned on said keyboard frame and which are vertically pivotable;*

*a plurality of return springs each of which corresponds to one of said keys and has one end stopped by its said corresponding one of said keys and an other end stopped by said keyboard frame so as to bias each said corresponding one of said keys toward a non-struck position;*

*a plurality of pivot members each of which corresponds to one of said keys and is disposed on said keyboard frame at an end of a longitudinal axis of said corresponding one of said keys, and has an arcuate surface to be brought into slidable contact with a back end portion of said corresponding one of said keys so as to allow each of said keys to perform pivotal movement;*

*said back end portion of each of said keys being spring-biased against said arcuate surface of its said corresponding pivot member by means of its said corresponding return spring; and*

*wherein said keyboard frame has a vertical wall bent downward at a back end thereof, each of said pivot members has an extended portion bent at said keyboard frame back end, and there is further provided a lock member disposed between a groove formed in said extended portion and a stopper portion formed in said vertical wall.*

*34. A keyboard device of an electronic musical instrument, comprising:*

*a keyboard frame;*

*a plurality of keys which are aligned on said keyboard frame and which are vertically pivotable;*

*a plurality of return springs each of which corresponds to one of said keys and has one end stopped by its said corresponding one of said keys and an other end stopped by said keyboard frame so as to bias each said corresponding one of said keys toward a non-struck position;*

*a plurality of pivot members each of which corresponds to one of said keys and is disposed on said keyboard frame at an end of a longitudinal axis of said corresponding one of said keys, and has an arcuate surface to be brought into slidable contact with a back end portion of said corresponding one of said keys so as to allow each of said keys to perform pivotal movement;*

*said back end portion of each of said keys being spring-biased against said arcuate surface of its said corresponding pivot member by means of its said corresponding return spring; and*

*wherein said arcuate surface has such a large radius of curvature that an imaginary center of the curvature is located on an imaginary plane behind said keyboard frame.*

* * * * *

UNITED STATES PATENT AND TRADEMARK OFFICE

CERTIFICATE OF CORRECTION

PATENT NO. : Re. 35,161

DATED : February 27, 1996

INVENTOR(S) : Kumano et al.

It is certified that errors appear in the above-identified patent and that said Letters Patent is hereby corrected as shown below:

In column 7 at line 7, please delete "annular 1" and insert -- annular --.

In column 12, claim 1 at line 21, please delete " [ and has " and insert -- and [ has --.

In column 12, claim 2 at line 48, please delete "g".

UNITED STATES PATENT AND TRADEMARK OFFICE

CERTIFICATE OF CORRECTION

PATENT NO. : Re. 35, 161

DATED : February 27, 1996

INVENTOR(S) : Kumano et al.

It is certified that errors appear in the above-identified patent and that said Letters Patent is hereby corrected as shown below:

In column 12, claim 4 at line 58, please delete "corresponding a " and insert -- a corresponding --.

In column 12, claim 5 at line 65, please delete " in front " and insert -- in a front --.

UNITED STATES PATENT AND TRADEMARK OFFICE

CERTIFICATE OF CORRECTION

PATENT NO. : Re. 35,161

DATED : February 27, 1996

INVENTOR(S) : Kumano et al.

It is certified that errors appear in the above-identified patent and that said Letters Patent is hereby corrected as shown below:

In column 18, claim 30 at line 46, please delete"corresponding" and insert --corresponds --.

Signed and Sealed this

Fifteenth Day of October, 1996

*Attest:*

Bruce Lehman

BRUCE LEHMAN

*Attesting Officer*

*Commissioner of Patents and Trademarks*